(12) United States Patent
Fery

(10) Patent No.: US 12,268,193 B1
(45) Date of Patent: Apr. 8, 2025

(54) ANIMAL RETENTION APPARATUS AND METHOD

(71) Applicant: Mitchell Fery, Astoria, OR (US)

(72) Inventor: Mitchell Fery, Astoria, OR (US)

( * ) Notice: Subject to any disclaimer, the term of this patent is extended or adjusted under 35 U.S.C. 154(b) by 646 days.

(21) Appl. No.: 17/674,841

(22) Filed: Feb. 18, 2022

Related U.S. Application Data

(63) Continuation-in-part of application No. 16/950,762, filed on Nov. 17, 2020, now Pat. No. 11,582,953.

(51) Int. Cl.
*A01K 15/04* (2006.01)
*A01K 13/00* (2006.01)

(52) U.S. Cl.
CPC ............ *A01K 15/04* (2013.01); *A01K 13/001* (2013.01)

(58) Field of Classification Search
CPC ........ A61D 3/00; A01K 1/031; A01K 1/0613; A01K 15/00; A01K 13/00
See application file for complete search history.

(56) References Cited

U.S. PATENT DOCUMENTS

| | | | | |
|---|---|---|---|---|
| 3,120,836 A | * | 2/1964 | Brauning | A61D 3/00 269/329 |
| 4,213,424 A | * | 7/1980 | Hosch | A01K 15/04 119/728 |
| 4,995,335 A | * | 2/1991 | Wright | A01K 15/00 119/738 |
| 5,213,061 A | * | 5/1993 | Zito | A61D 3/00 119/755 |
| 7,584,719 B2 | * | 9/2009 | John | A01K 1/0613 119/751 |
| 7,806,088 B2 | * | 10/2010 | Osada | A61D 3/00 119/752 |

OTHER PUBLICATIONS

Lynn Professional, Overhead Restraint System for Pet Grooming, YouTube Video, Jan. 23, 2018, 1 page snapshot of video, YouTube, Winnipeg, CA.
Chuck Simons, Groomers Helper—The No Sit Feature, YoutTube Video, Jan. 5, 2011, 1 page snapshot of video, YouTube, Margate, USA.

* cited by examiner

Primary Examiner — Yvonne R Abbott-Lewis
(74) Attorney, Agent, or Firm — Howard Russell

(57) ABSTRACT

Animal retention apparatus, and method and applications thereof, having a frame member with multiple passageways, support guides, and a tie member adapted for retaining its shape as formed by a user, the support guides being adapted for being inserted into the passageways and removably held at desired locations in the frame member, together with wrapping of the tie member around the animal, all to enhance retention of the animal with support guides and the tie member coming in adjacent contact with an animal's anatomy to hold the animal in a desired position as the animal is positioned alongside the frame member, and wherein once work on one side of the animal is completed, the animal may be removed and relocated within the retention apparatus to allow working on the other side of the animal.

15 Claims, 14 Drawing Sheets

ANIMAL RETENTION APPARATUS AND METHOD

CONTINUITY AND CLAIM OF PRIORITY

This is a Continuation-in-Part U.S. patent application of U.S. patent application Ser. No. 16/950,762, filed Nov. 17, 2020 entitled Animal Retention Apparatus and Method.

FIELD

The invention generally relates to animal retention apparatuses, and more particularly to animal retention apparatuses that hold an animal in a desired position for working on the animal and applications thereof while allowing the user to easily reposition the animal for access to various parts of the animal anatomy during grooming or veterinary procedures.

BACKGROUND

There are many situations in which an animal must be held relatively still in a desired position, such as during veterinary procedures and grooming sessions. In the past, there have been two methods of retaining an animal in a desired position. One method has been to restrain the animal by applying physical force or using mechanical restraints, such as with a leash. Another method has been to administer a tranquilizing or calming substance to the animal before beginning work.

Restraining an animal with physical force or restraints causes stress for the animal. Often, an animal that is held by either physical force or mechanical restraints will struggle in an effort to be free. In the process, an animal could attain a possible neck or groin injuries. Further, the person holding down an animal may also sustain injuries from an aggressive animal, such as bites and scratches.

And while it has become a common practice to administer tranquilizing or calming substances to animals before working on them, these substances also may have negative side effects. Concerned animal owners may prefer not to use such substances, even naturally occurring ones.

Another problem has been that often more than one person has been needed to retain an animal in a desired position. For example, a veterinary assistant may have been necessary to hold down a struggling angry cat while a veterinarian has examined and administered a vaccination shot. Therefore, a less stressful way of retaining an animal has been needed and desirable.

During the course of grooming or treating an animal, the service provider must often reposition the restraint system to allow access to alternate parts of the animal's anatomy. In the course of grooming or treatment, there is often required a need to reposition the animal, and this repeatedly, adding to the stress associated with grooming and treatment of animals generally. Thus, to reduce the stress of such work, there is needed a means to quickly administer restraint of animals which will allow service providers to do their job without unduly traumatizing the animal receiving treatment.

SUMMARY

In accordance with an aspect and embodiment of the disclosure, the animal retention apparatus has at least one support guide (also referred to herein as a rod or dowel, or as a plurality, rods or dowels) and a frame member with at least one passageway that receives and removably holds the support guide at a height and width location in the frame member. The support guide sticks out of the frame member at a location corresponding to a portion of the animal's anatomy adapted for use in reassuring a desired position of the animal as the animal is brought into adjacent contact with the support guide when the animal is positioned alongside the frame member. The animal retention apparatus may preferably have a plurality of support guides and a plurality of passageways. The frame member may preferably be rectangular prism shaped. Other shapes, besides rectangular prism shaped, also may be used. The support guides and the frame member may be wooden, or other materials, such as stainless steel, rubber, and/or plastic, may be used for the support guides and the frame member. The support ties may preferably be wooden dowels covered with a vinyl coating.

In accordance with an aspect and embodiment of the disclosure, the frame member is rectangular prism shaped with at least a first side and a second side that are substantially planar and parallel to each other. The passageways are comprised of a plurality of aligned through holes defined in each the first side and the second side. With this embodiment, there are at least six, preferably aligned, through holes, but there may be even nine or more holes in an embodiment, on each the first side and the second side of the frame member. The plurality of support guides are preferably rods, or dowels, such as wooden dowels or aluminum rods.

In accordance with another aspect and embodiment of the disclosure, the plurality of support guides, which may be rods or dowels, may be inserted into the plurality of passageways, or holes, on the first side in various angles so that the plurality of support guides exit the second side in non-parallel fashion from the holes the support guides entered through, to allow the plurality of support guides to stick out of, or protrude from, the second side in closer positions to one another than they would have if they were inserted through corresponding parallel holes. This angling of the support guides helps keep an animal more securely in position to further prevent escaping, and greatly improves control over the animal for non-professionals, such as pet owners. It will be appreciated by those of ordinary skill in the art that the plurality of support guides may be inserted the same way from the second side to stick out of, or protrude from, desired positions on the first side, and further it will be appreciated that the holes need not be aligned, or parallel, relative to each other, but rather any pattern of holes on either side of the frame member may be used to define a passageway, or through-holes, all without departing from the scope and spirit of the invention as claimed.

In accordance with yet another aspect and embodiment of the disclosure, the frame member is rectangular prism shaped, with a first side and a second side. The support guides stick out of, or protrude from, the first side and the second side in lengths adequate to allow an animal to be brought into adjacent contact or positioned alongside each the first side and the second side of the frame member without the need to adjust the support guides' locations within the frame member.

In accordance with still another aspect and embodiment of the disclosure, a method of working on an animal involves obtaining an animal retention apparatus comprising a frame member having at least a first side and a second side and a plurality of support guides adapted for removable retention at least partially within the frame member. As an animal is positioned alongside, or otherwise brought into adjacent contact with the first side of the frame member, the support guides are placed at height and width locations defined by the frame member to extend outwardly from the frame member and in adjacent contact with the animal's anatomy so that the support guides are adapted to hold the animal in a desired position. In this way, work may easily be done on a side of the animal that is facing away from the first side of the frame member. Once the work on the current side of the animal is done, the animal may be removed from the animal retention apparatus, and the animal may be placed into a position adjacent positioned alongside the second side of the frame member. Work may then be done on the other side of the animal (i.e., on the side of the animal that is now facing away from the second side of the frame member). The work performed in the method may be grooming, veterinary work, washing an animal, or other works that require holding an animal in desired position. The animal worked on may be a dog or other animals as well.

Thus, in accordance with one or more aspects of the disclosure, and an embodiment of the disclosure, an animal retention apparatus is provided having a plurality of rods and a rectangular prism-shaped frame member. The frame member of this embodiment has at least a first side and a second side, both sides of which are substantially parallel to each other and planar, each side having a plurality of passageways, or aligned through holes. The passageways are adapted to receive and removably hold the rods at variable height and width locations in the frame member so that the rods are adapted for sticking out of the frame member at locations corresponding to portions of the animal's anatomy which a user may desire to support, hold, or restrain. The plurality of rods may be inserted into the aligned through holes on the first side in various angles so that the plurality of rods exit the second side from non-parallel holes from the holes the rods entered through, to allow the plurality of rods to stick out of, or protrude from, the second side in closer positions to one another than they would have if they were inserted through their parallel, or aligned, holes. This angling of the rods helps keep an animal more securely in position to further prevent escaping, and greatly improves control over the animal for non-professionals, such as pet owners. Thus, the apparatus is adapted for use in reassuring a desired position of the animal as the animal is positioned alongside the second side of the frame member, as well as adjacent and/or in contact with the rods as the animal is positioned alongside the second side of the frame member for working on the side of the animal that is facing away from the frame member. It will be appreciated by those of ordinary skill in the art that the plurality of support guides may be inserted the same way from the second side to stick out of, or protrude from, desired positions on the first side.

The apparatus may also be adapted for use in reassuring a desired position of the animal as the animal is positioned alongside the first side of the frame member, as well as adjacent and/or in contact with the rods as the animal is positioned alongside the first side of the frame member for working on the side of the animal that is facing away from the frame member. Thereafter, the apparatus is adapted such that an animal may be removed and positioned alongside the second side of the frame member (where the rods are also preferably sticking out and may be brought to adjacent contact with the animal's anatomy) for working on the side of the animal that is now facing away from the frame member. While the rods may be wooden dowels, it will be appreciated by those of ordinary skill in the art that other materials may also be used for the rods. Further, the frame member may be wooden, plastic, metal, or other suitably rigid material. The rods may preferably stick out of, or protrude from, each the first side and the second side of the frame member in lengths adequate to allow an animal to be brought into adjacent contact with the rods on each the first side and the second side of the frame member, each without adjusting the support rods' locations within the frame member.

Thus, in accordance with one or more aspects and embodiments of the disclosure, the rods in the frame member may be adapted for assuring a desired position of a dog during grooming. The rods and passageways may be adapted for positioning at least one rod portion beneath the dog's abdomen to prevent the dog from sitting or lying down during grooming, they may be adapted for positioning at least one rod portion beneath the dog's abdomen and another rod portion above the dog's back to prevent the dog from sitting, lying or jumping during grooming, and the rods and passageways may be adapted for positioning at least one rod portion beneath the dog's abdomen, at least one rod portion above the dog's back, and at least another rod portion in front of the dog's chest to prevent the dog from sitting, lying, jumping or lunging during grooming.

In accordance with another aspect and embodiment of the disclosure, there is provided an animal retention apparatus, comprising: at least one support guide, at least one tie member, such as a flexible twist tie-type member adapted for retaining a user-imposed shape, and a frame member having at least one passageway defined therein to receive and removably hold the support guide at a height and width location in the frame member such that the support guide sticks out of the frame member at a location corresponding to a portion of the animal's anatomy adapted for use in reassuring a desired position of the animal as the animal is brought into adjacent contact with the support guide as the animal is positioned alongside the frame member, wherein the tie member is adapted for wrapping around a portion of said animal's anatomy and a portion of the support guide.

The tie member of this aspect and embodiment of the disclosure preferably comprises a reusable rubber-exterior twist tie-type member having an internal wire for allowing the tie member to maintain a user-imposed shape to wrap around animal anatomy to be retained relative to the animal retention device. Alternatively, the tie member may be of unitary bendable construction.

In accordance with an embodiment, there may be provided a plurality of support guides adapted for use with a plurality of passageways. Thus, with such embodiment the support guides are enabled in sticking out of the frame member at variable positions corresponding to portions of the animal's anatomy and adapted for use in reassuring a desired position of the animal as the animal is brought into adjacent contact with the support guides as the animal is positioned along the frame member. Further, with such an embodiment, the tie member is adapted for being wrapped around at least one of the plurality of support guides and positioned around the animal in one of around and above the animal, in front of the animal, behind the animal, and around and under the animal. Alternatively, the tie member may be wrapped around a plurality of the plurality of support guides, and it will further be appreciated that a plurality of tie members may be employed without departing from the scope of the animal retention device of the disclosure as claimed.

In accordance with an aspect of the disclosure, there is provided a method of working on an animal, comprising:
  obtaining an animal retention apparatus, the animal retention apparatus comprising a frame member having a first side, a second side and a plurality of support guides adapted for removable retention partially within the frame member, and a tie member preferably adapted for retaining a user-imposed shape while wrapping around an animal and a support guide;

positioning an animal alongside the first side of the frame member;

placing the support guides at height and width locations defined by the frame member so as to extend outwardly from the frame member so that the support guides are adapted to reinforce or hold the animal in a desired position;

wrapping a first end of the tie member around a support guide between the animal and the frame member;

wrapping an intermediate portion of the twist tie around the animal's body;

wrapping a second end of the twist tie around a support guide adjacent a side of the animal opposite the side adjacent which the first end of the twist tie is wrapped;

working on a side of the animal that is facing away from the first side of the frame member;

at least partially removing the tie member from around the support guide and from around the animal; and removing the animal from the animal retention apparatus.

Thus, in accordance with an aspect of the disclosure, a method of working on an animal involves obtaining an animal retention apparatus comprising a frame member having at least a first side and a second side and a plurality of support guides adapted for removable retention at least partially within the frame member and a tie member adapted for wrapping around an animal and a support guide. As an animal is positioned alongside, or otherwise brought into adjacent contact with the first side of the frame member, at least one support guide is placed at height and width locations defined by the frame member to extend outwardly from the frame member and in adjacent contact with the animal's anatomy so that the support guides provide a base to allow the tie member to wrap around a support guide and the animal to retain the animal adjacent the support guide. The tie member preferably retains a user-imposed shape to wrap around the animal anatomy while being secured to the support guide and adapted to hold the animal in a desired position. In this way, work may easily be done on a side of the animal that is facing away from the first side of the frame member. Once the work on the current side of the animal is done, the animal may be removed from the animal retention apparatus (including being unwrapped from the tie member), and the animal may be placed into a position adjacent positioned alongside the second side of the frame member. The tie member preferably adapted to maintain shape can then be repositioned and wrapped around the animal and a support guide to secure the animal. Work may then be done on the other side of the animal (i.e., on the side of the animal that is now facing away from the second side of the frame member). The method and apparatus of the present disclosure may be used for grooming, veterinary work, washing an animal, or other works that require holding an animal in desired position. The animal worked on may be a dog or other animals as well.

In accordance with an aspect and embodiment of the disclosure, there is provided an animal retention apparatus, comprising: a plurality of rods, a frame member having at least a first side and a second side that are parallel planar to each other, each the first side and the second side defining a plurality of aligned passageways adapted to receive and removably hold the rods at variable height and width locations in the frame member such that the rods are adapted for sticking out of the frame member at locations corresponding to portions of the animal's anatomy. In accordance with this embodiment, there is further provided at least one flexible tie member adapted for being wrapped and retain around at least one of the plurality of rods, wherein the animal retention apparatus is adapted for use in reassuring a desired position of the animal as the animal is enabled in positioned alongside the first side of the frame member in adjacent contact with the rods. Thus, the animal is further retained by the at least one flexible tie member (and the rods) as the animal is positioned alongside the first side of the frame member, and this enables working on a side of the animal that faces away from the first side. After work is done on the first side of the animal, it may be positioned alongside the second side of the frame member, together with being retained by the at least one flexible tie member, for working on the other side of the animal that is now facing away from the second side of the frame member.

Preferably, the tie member of this aspect and embodiment of the disclosure is preferably reusable and may comprise a rubber outer portion with a wire core adapted for allowing changed reconfiguration of portions of the tie member and so that it may retain such changed reconfiguration to better and more securely hold an animal in place during use. Alternatively, the tie member may be of unitary bendable construction.

In accordance with one or more aspects of the disclosure, the tie member of the present disclosure may assist with restraining the animal in a number of different ways, a number of different positions, and possibly for a number of different purposes as follows:

with the tie member adapted for being wrapped around at least one of the plurality of rods and positioned around the animal in one of around and above the animal, in front of the animal, behind the animal, and around and under the animal, such as for example for grooming the animal;

with the rods, passageways, and the tie member adapted for assuring positioning of a dog, with at least one rod portion beneath the dog's abdomen to prevent the dog from sitting or lying down, such as for example during grooming or performing a veterinary procedure;

with the passageways, the rods, and the tie member are adapted for assuring positioning with a rod portion positioned above the dog's back, with the tie member wrapping beneath the dog, to prevent the dog from jumping up during grooming, during a veterinary procedure, or during other training exercise;

with the passageways, the rods, and the tie member adapted for positioning a portion of the tie member in front of the dog's chest to prevent the dog from lunging forward during grooming, a veterinary procedure, or during other situation where an animal may need to be held in place;

with the passageways, the rods, and the tie member adapted for positioning a portion of the tie member behind the dog's rear to prevent the dog from backing out of the restraint during grooming, veterinary procedure, or during other situation where an animal may need to be held in place; and.

with the passageways, the rods, and the tie member adapted for assuring positioning with a rod portion below the dog and with the tie member wrapping around and above the dog, to prevent the dog from jumping up or lying down.

The subject matter of the present invention is particularly pointed out and distinctly claimed in the concluding portion of this specification. However, both the organization and method of operation, together with further advantages and

BRIEF DESCRIPTIONS OF DRAWINGS

Figure 8:
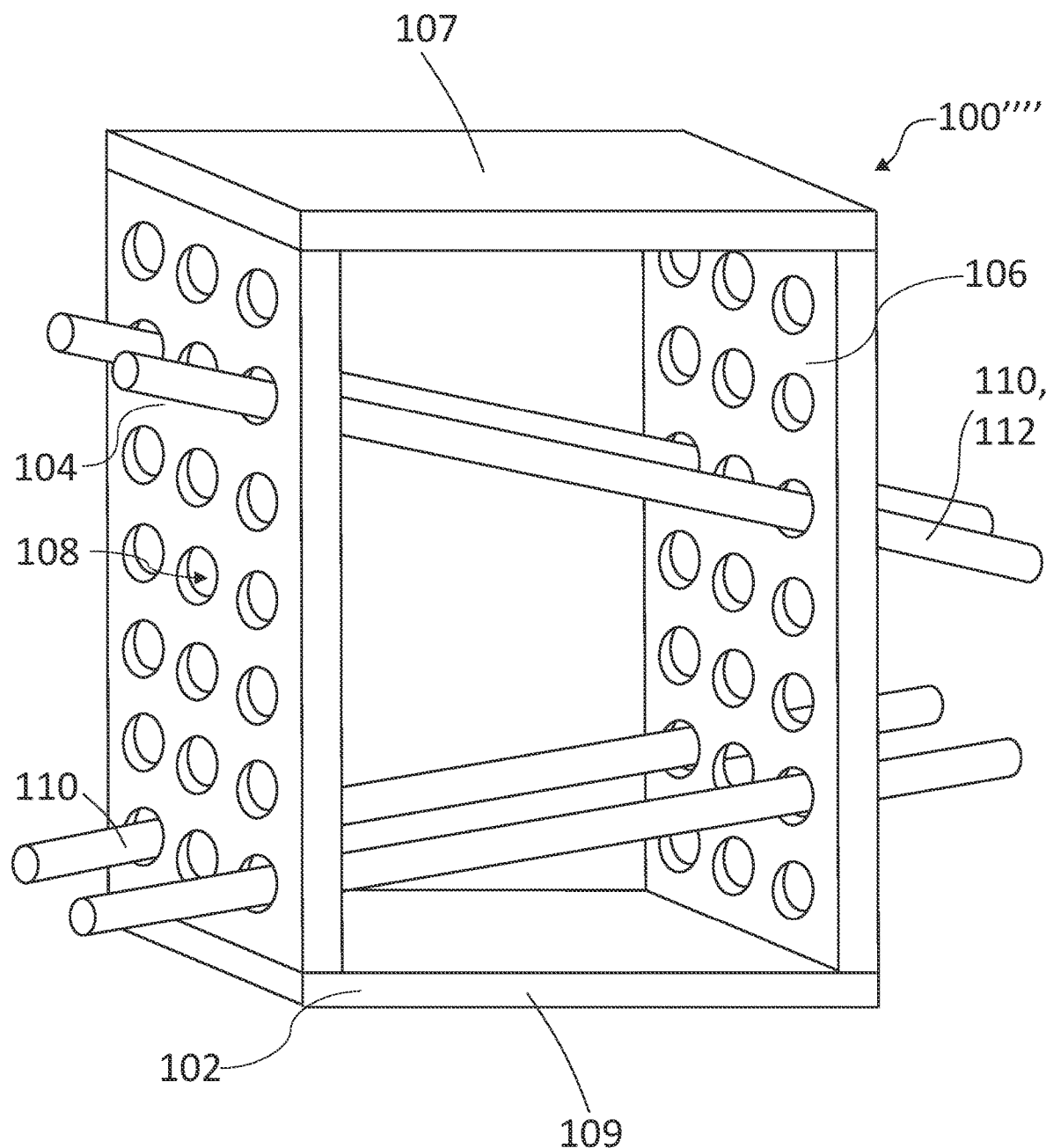

FIG. 8 is a perspective view of an open box embodiment of an animal retention apparatus in accordance with one or more aspects of the disclosure, the apparatus having a frame member that is a rectangular prism in shape, that stands vertically, and that defines passageways for removably holding a plurality of rods or support guides at angled positions so as to more securely hold an animal to further prevent the animal from escaping.

Figure 9:
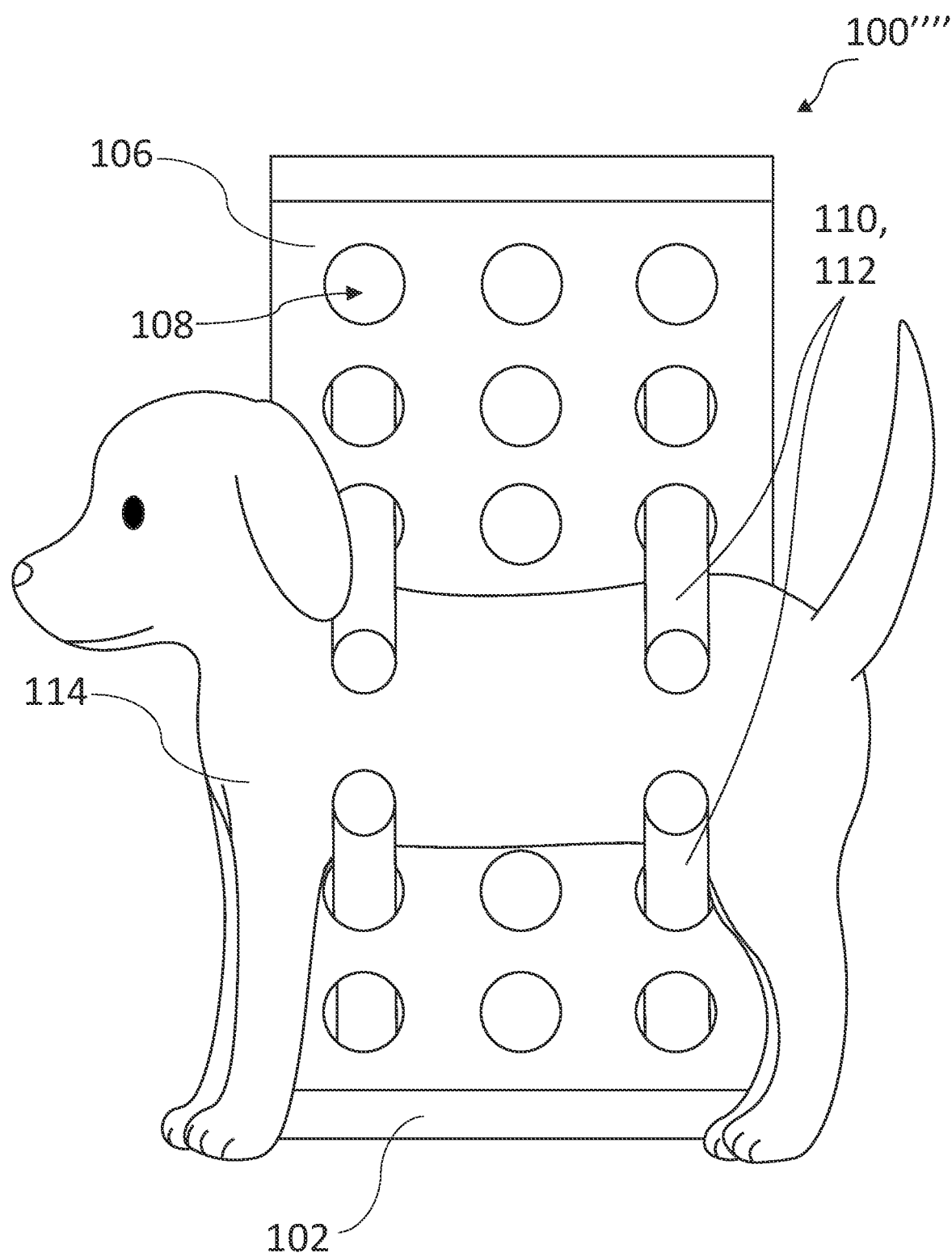

FIG. 9 is a frontal view embodiment of the animal retention device in FIG. 8, that is rectangular prism shaped, is standing vertically, and is also holding an animal in a desired position relative to a second side of the frame member.

Figure 10:
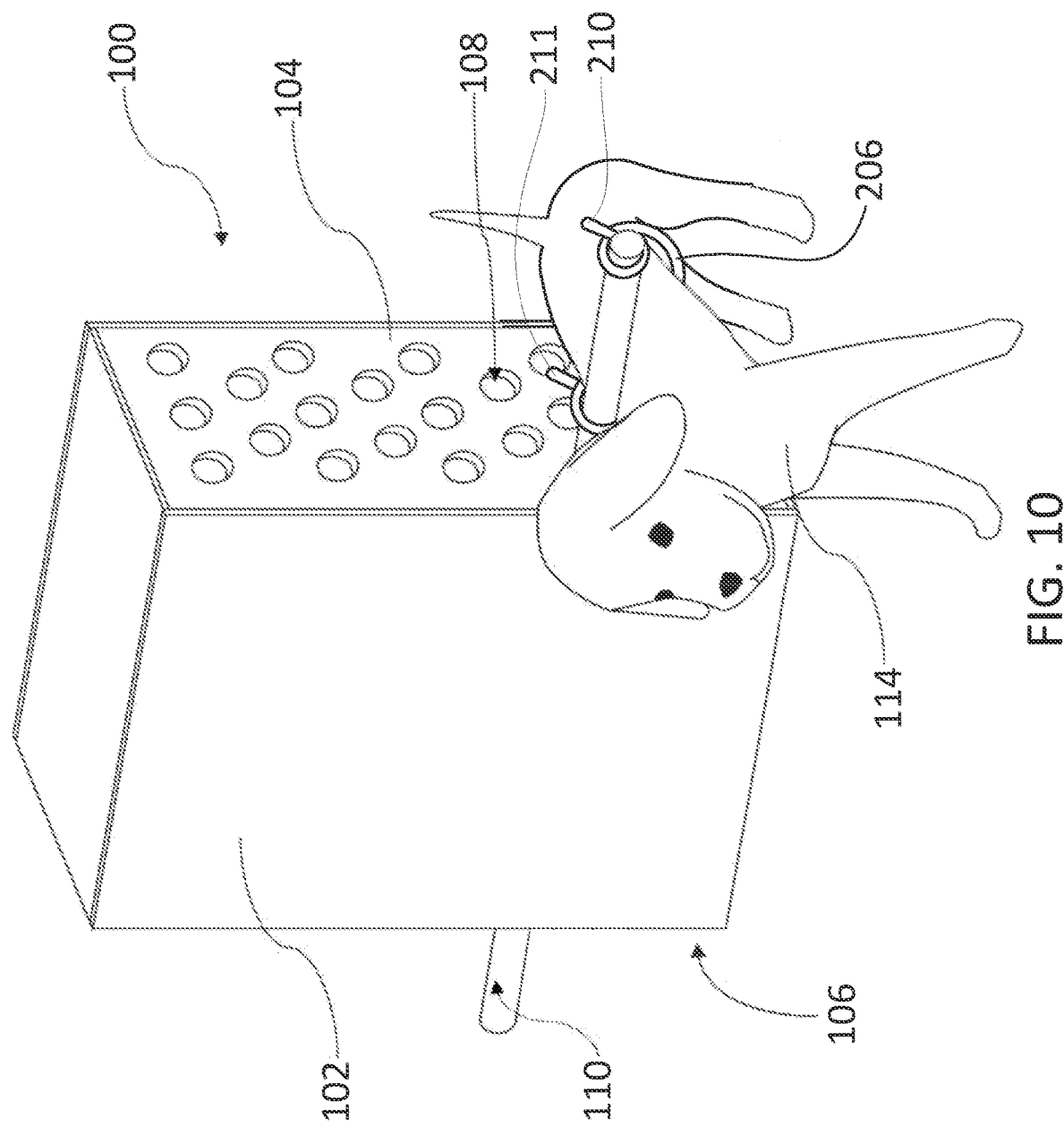

FIG. 10 is a perspective view of an embodiment of an animal retention apparatus having a frame member that is rectangular prism shaped and is standing vertically, showing a side of the frame member and support guides providing a base for wrapping around a reusable rubber tie member with internal wire to maintain shape for holding an animal in a desired position.

Figure 11:
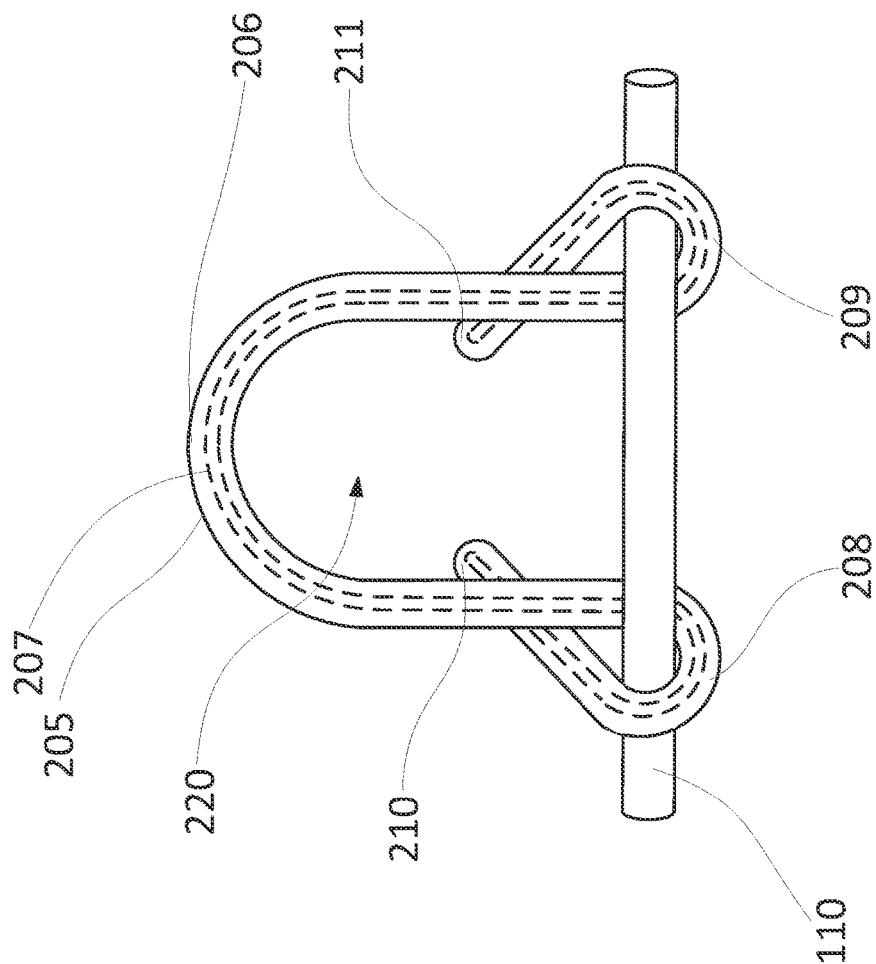

FIG. 11 is a left side view of an embodiment of an animal retention device rod with a reusable rubber tie member with internal wire to maintain a user-imposed shape configured to secure an animal (not shown) by placing the rod under some part of the animal's anatomy and further securing the animal with the rubber tie member wrapped around (above) the animal and attaching the tie member back to the rod.

Figure 12:
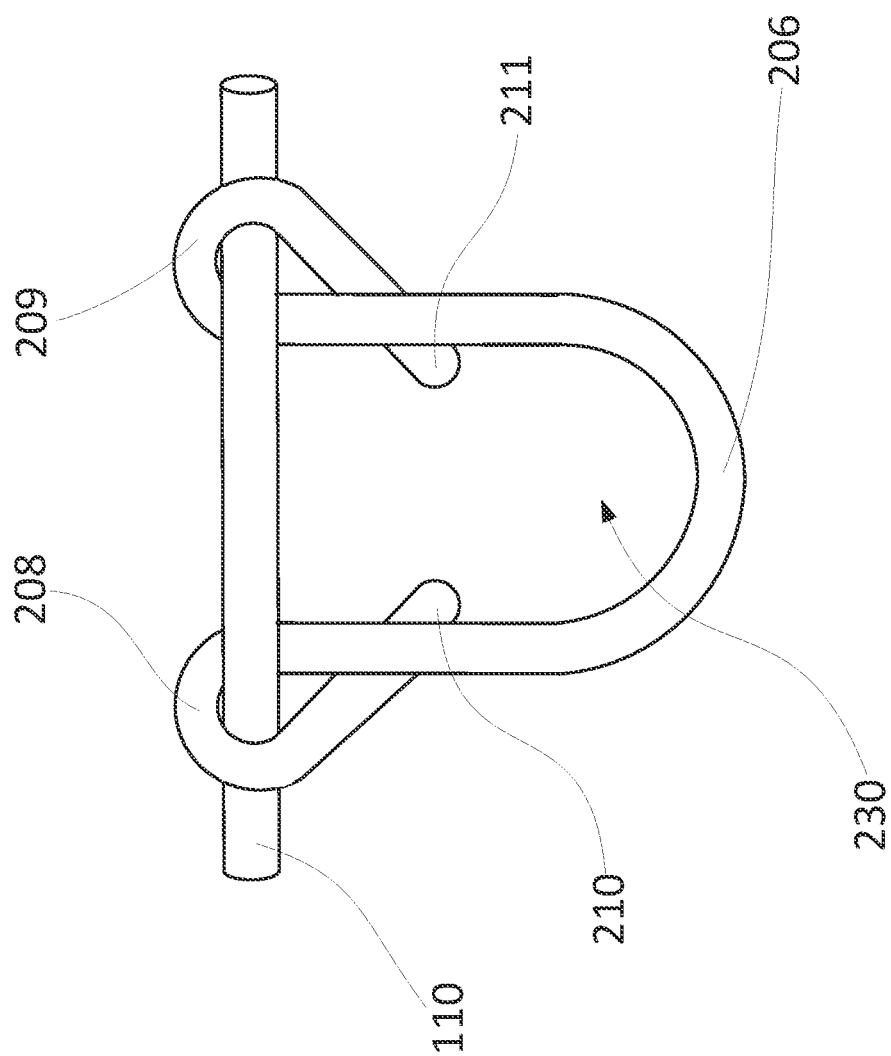

FIG. 12 if a left side view of an alternative embodiment of an animal retention device rod with a reusable tie member with internal wire to maintain shape configured to secure an animal (not shown) by placing the rod above some part of the animal's anatomy and further securing the animal with the tie member wrapped around (underneath) the animal and attaching the tie member back to the rod.

Figure 13:
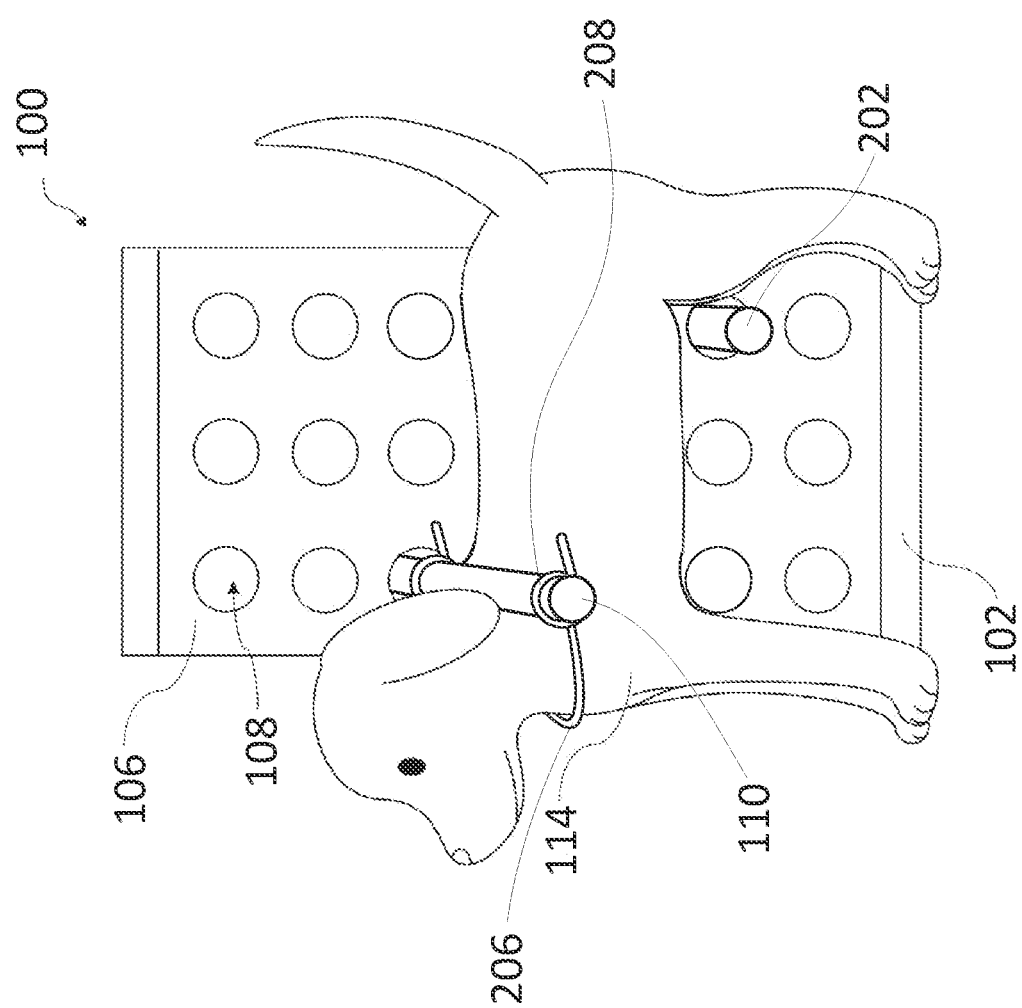

FIG. 13 is a front view of an embodiment of an animal retention apparatus having a frame member that is rectangular prism shaped and is standing vertically, showing a side of the frame member and support guides providing a base for a reusable tie member with internal wire to maintain shape while holding an animal in a desired position, wherein the tie member is wrapped around the neck of the animal and secured to the support guide, and wherein an additional support guide is placed under the animal to further secure the animal in place.

DETAILED DESCRIPTION

The present disclosure provides various embodiments of an animal retention apparatus, use applications thereof, and a related method of working on an animal.

Figure 1:
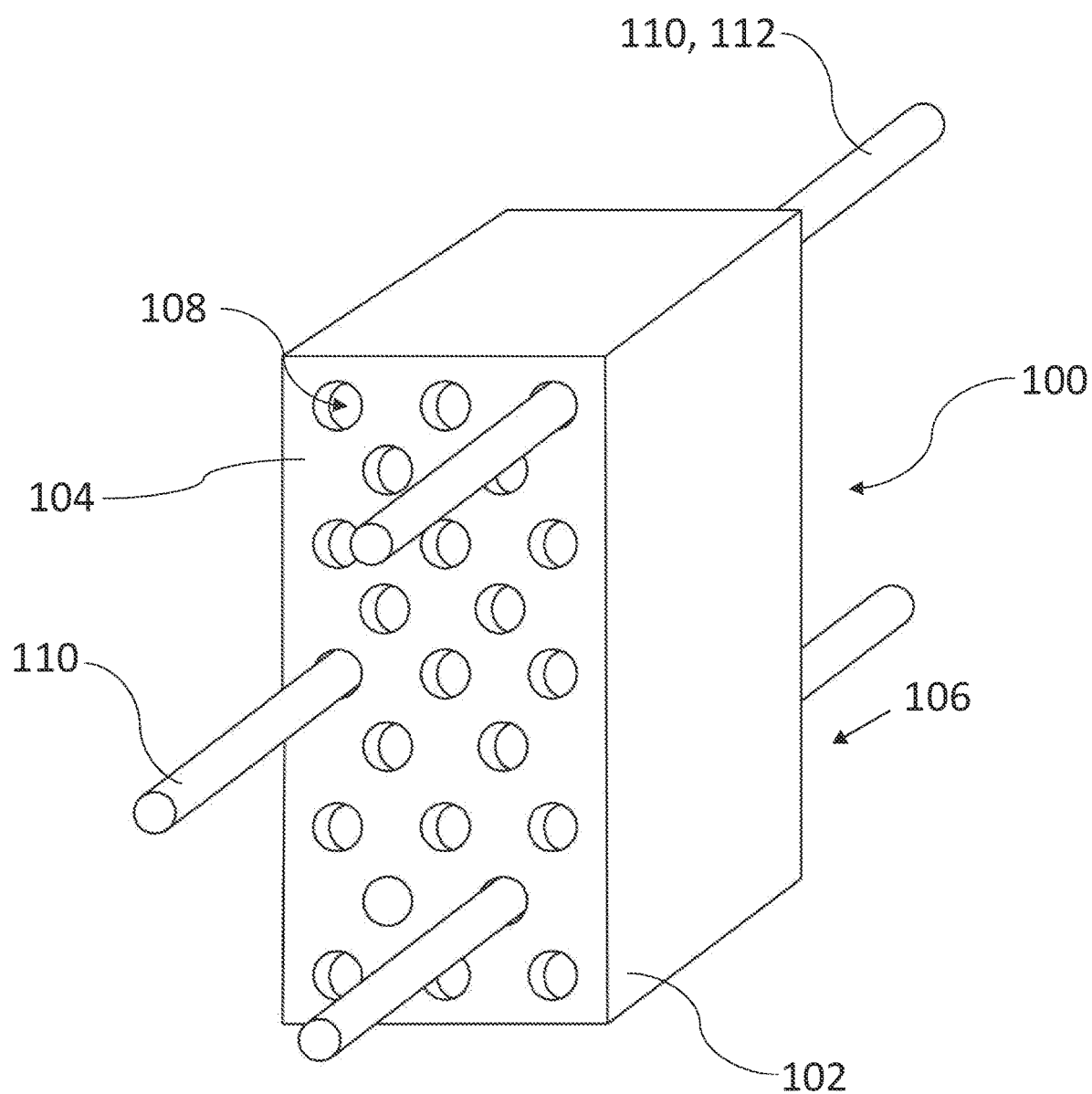
FIG. 1 is a perspective view of an embodiment of an animal retention apparatus that comprises a rectangular prism-shaped frame member.

Referring to FIG. 1, there is shown a perspective view of an embodiment of an animal retention apparatus 100 comprising an at least partially enclosed frame member 102 having a first side 104 and a second side 106 (not shown) which are preferably parallel to each other and planar. FIG. 1 shows only the first side 104 of the frame member 102, and the frame member 102, as shown, is preferably in the shape of a rectangular prism. Animal retention apparatus 100 is shown standing vertically in FIG. 1, and one side of its frame member 102 is shown defining twenty-three passageways 108 therein. The passageways 108 are preferably circular holes 108, with the circular holes 108 preferably passing through the first side 104, and with the second side 106 (not shown) having a similarly-patterned plurality of holes 108 therein and passing through corresponding to the first pattern of holes 108 shown defined in the first side 104.

In accordance with an aspect of the disclosure, the animal retention apparatus 100 of this embodiment preferably further comprises a plurality of support guides, such as rods or dowels, 110. Each of the support guides 110 is receivable, received, and removably held in place by one of the passageways 108. FIG. 1 illustrates three support guides 110 (though more or fewer may be employed) that are long enough in length to be sticking out from both the illustrated first side 104 of the frame member 102, as well as from the second side 106 (not shown) of the frame member that is preferably parallel planar to the shown first side 104. It will further be appreciated that rear portions 112 of only two of the three support guides 110 illustrated are visible at the second side 106 that is parallel planar to the first side 104 of the frame member 102 due to perspective. Of course, it will be appreciated by those skilled in the art that fewer or more passageways 108 and/or support guides 110, they perhaps being implemented in different patterns and positions, may be employed, the user being free to use and adjust the number and the locations of support guides 110 as desired, all without departing from the true scope of the invention as claimed.

Figure 2A:
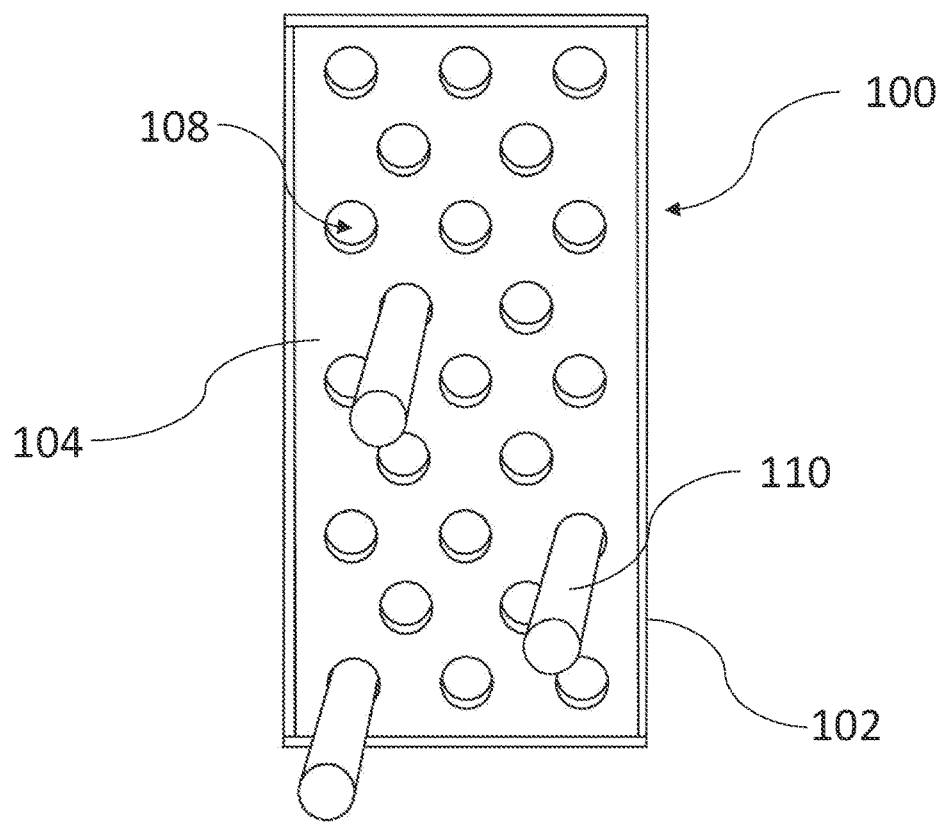
FIG. 2A is a front view of an embodiment of an animal retention apparatus having a rectangular prism shaped frame member that is standing vertically.

Referring to FIG. 2A, there is shown a front view of the animal retention apparatus 100 of FIG. 1 that comprises an at least partially enclosed frame member 102 that has at least a first side 104 and a second side 106 (not shown). The first side 104, the second side 106 (not shown) and other sides (not shown) of the frame member together comprise a rectangular prism shape. As in FIG. 1, the animal retention apparatus 100 is standing vertically and the frame member 102 defines twenty-three passageways 108 passing through the first side 104 and the second side 106 (not shown) of the frame member 102. The passageways 108 again preferably comprise circular holes 108 in this embodiment, with the circular holes 108 passing through the first side 104 and with the second side 106 having a similarly-patterned plurality of circular holes 108 therein and passing therethrough corresponding to the first pattern of circular holes 108 shown defined in the first side 104. The passageways 108 thus pass through from the first side 104 illustrated as well as through the parallel planar second side 106 that is not showing. As described in connection with FIG. 1, each of the support guides 110 is receivable, and adapted to be received, and removably held, by any of the passageways 108. The support guides 110 are preferably comprised of rods (e.g., wooden dowels, aluminum rods, plastic rods, or other metal-type rods) in this embodiment, and while there are only three support guides 110 shown present, it will be appreciated that more or fewer of such support guides 110 may be employed without departing from the true scope and spirit of the invention as claimed.

Figure 2B:
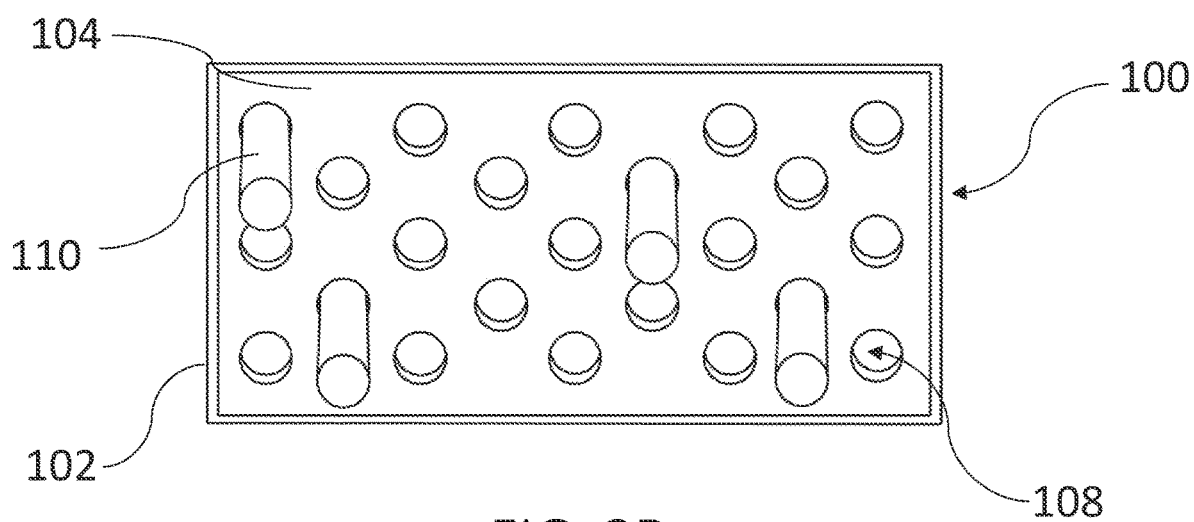
FIG. 2B is a front view of an embodiment of an animal retention apparatus that is rectangular prism shaped and that is standing horizontally.

Referring now to FIG. 2B, there is shown a front view of an embodiment of the animal retention apparatus 100 of FIGS. 1 and 2A, which comprises an at least partially enclosed, rectangular-prism-shaped, frame member 102 also defining twenty-three circular-hole passageways 108. However, the animal retention apparatus 100 of FIG. 2B is shown standing horizontally so as to be more useful in assuring the position of shorter, perhaps longer, animals.

The plurality of support guides 110, four of which are shown, is received and removably held by different passageways 108 than those shown in FIGS. 1 and 2A, thus illustrating the versatility of the animal retention apparatus 100 for being implemented in different ways (e.g., to support differently-shaped animal anatomy in different ways) all without departing from the true scope and spirit of the invention as claimed.

Figure 3A:
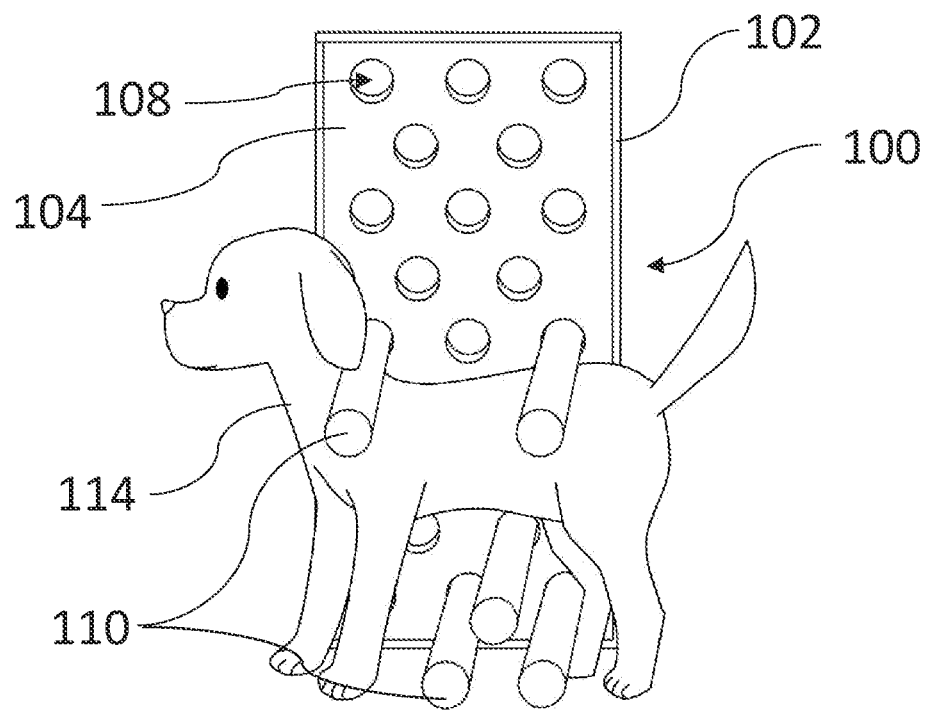
FIG. 3A is a front view of an embodiment of an animal retention apparatus that is rectangular prism shaped, is standing vertically, and is also holding an animal in a desired position relative to a first side of the frame member.

Referring to FIG. 3A, there is shown a front view, showing the first side 104 of the embodiment of the animal retention apparatus 100 shown in FIGS. 1, 2A, and 2B, which is at least partially enclosed and rectangular-prism-shaped, with frame member 102 also defining 23 circular-hole passageways 108. The animal retention apparatus 100 is standing vertically. However FIG. 3A additionally shows the frame member 102 positioned alongside a dog 114, or wherein the dog 114 is positioned alongside the frame member 102, with three support guides 110 positioned below the dog's abdomen, thus assuring an inability of the dog to sit or lay down. Further, there are shown two other support guides 110, one positioned above the dog's shoulder, to prevent the dog 114 from raising up on its hind legs, and another positioned above the dog's hind quarters, to prevent the dog 114 from jumping up or otherwise away. Thereby the dog 114 is retained in a desired position to be worked on for works such as grooming, washing, and veterinary work.

Figure 3B:
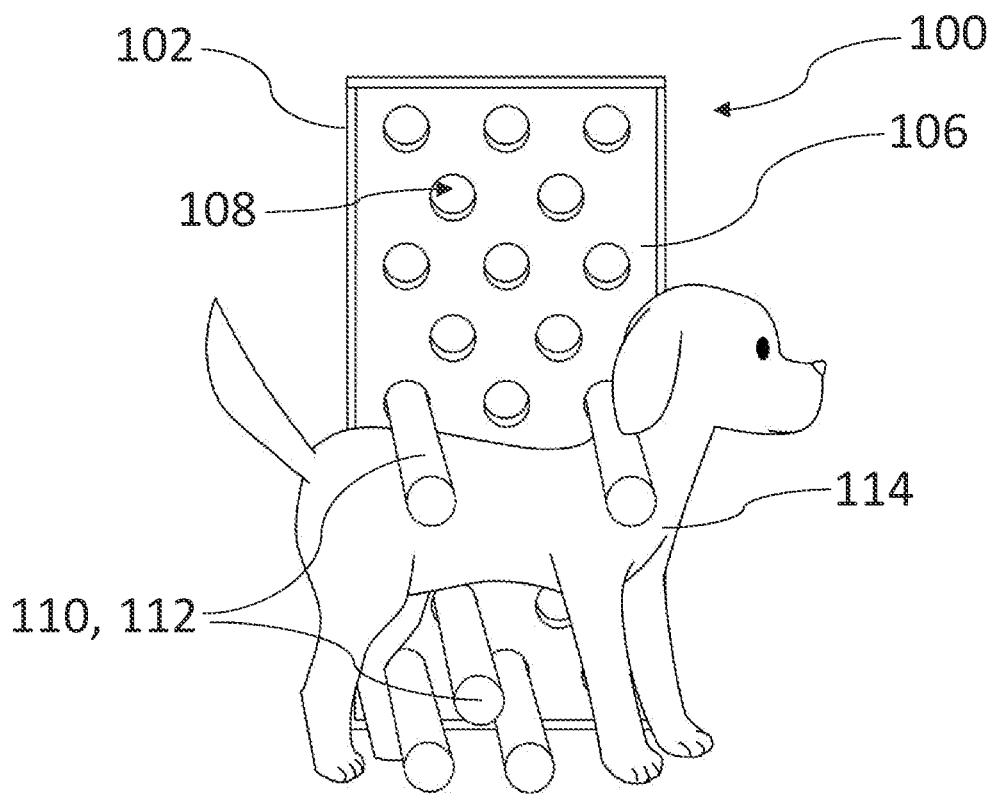
FIG. 3B is a front view of the embodiment of FIG. 3A of an animal retention apparatus having a frame member that is rectangular prism shaped, that is standing vertically, and that is showing its second side with an animal held in a desired position relative thereto.

Referring to FIG. 3B, there is shown a back view of the embodiment of the animal retention apparatus 100 and showing the second side 106 of the embodiment of the animal retention apparatus 100 shown in FIGS. 1, 2A, 2B and 3A, which is at least partially enclosed and rectangular-prism-shaped, with frame member 102 also defining twenty-three circular-hole passageways 108. The animal retention apparatus 100 is standing vertically. FIG. 3B illustrates the second side 106 of FIG. 3A, thereby illustrating how the dog 114 may be removed from the first side 104 (not shown) and then brought to the second side 106, which is parallel planar to the first side 104. FIG. 3B shows the frame member 102 positioned alongside the dog 114, or wherein the dog 114 is positioned alongside the frame member 102, without changing of the locations of the support guides 110 that were removably received from the first side 104 and held in the passageways 108. The rear portions 112 of the support guides 110 sticks out of the second side 106 at the same locations as the support guides 110 illustrated in FIG. 3A, and thereby they hold the dog 114 in the same desired position without the need to change the locations of the support guides 110. In this position, the dog 114 preferably faces the same direction as it did when it was positioned alongside the frame member 102 on the first side 104 as in FIG. 3A. This positioning exposes the dog's side that is facing away from the second side 106 (which was alongside the first side 104 in FIG. 3A) so a preferred work may be performed on the dog 114 on every side of the dog.

Figure 3C:
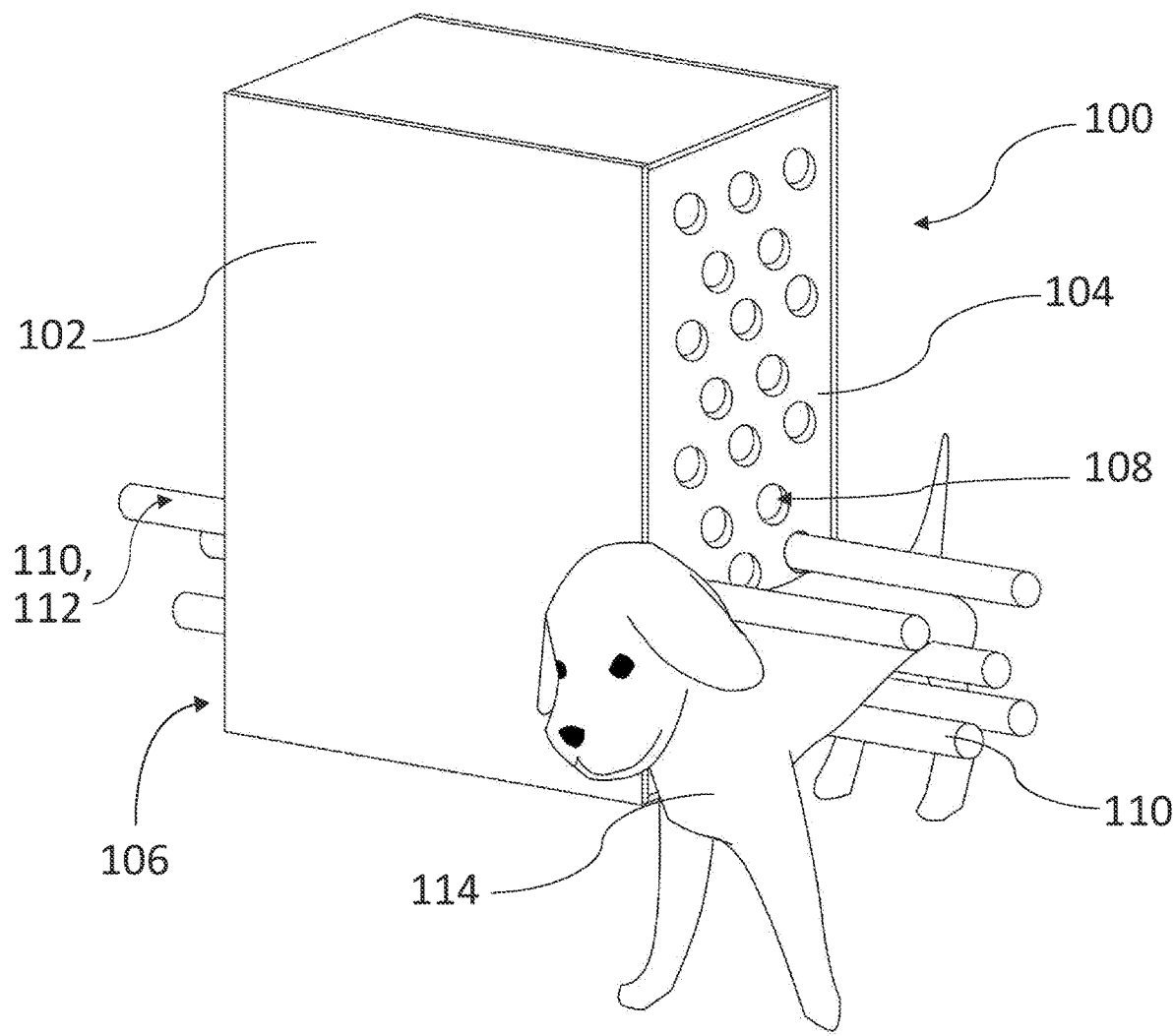
FIG. 3C is a perspective view of an embodiment of an animal retention apparatus having a frame member that is rectangular prism shaped and is standing vertically, showing a side of the frame member and support guides holding an animal in a desired position.

Referring to FIG. 3C, there is shown a perspective view of an embodiment of an animal retention apparatus 100 of FIGS. 1, 2A, 2B, 3A, and 3B. that is at least partially enclosed and rectangular-prism-shaped, with frame member 102 also defining 23 circular-hole passageways 108. The animal retention apparatus 100 is shown standing vertically in FIG. 3C and is illustrated at an angle that shows the first side 104 with a dog 114 positioned alongside the frame member 102 in the same way as FIG. 3A. The second side 106 of the frame member 102 is parallel planar to the first side 104. The animal retention apparatus 100 in FIG. 3C has same support guide 110 locations as FIG. 3A to illustrate a different view of the same usage of the animal retention apparatus 100. The rear portions 112 of the support guides 110 are in the same positions as those in FIG. 3B. It will be appreciated that rear portions 112 of only three of the five support guides illustrated are visible at the second side 106 of the frame member 102 due to perspective.

Figure 4:
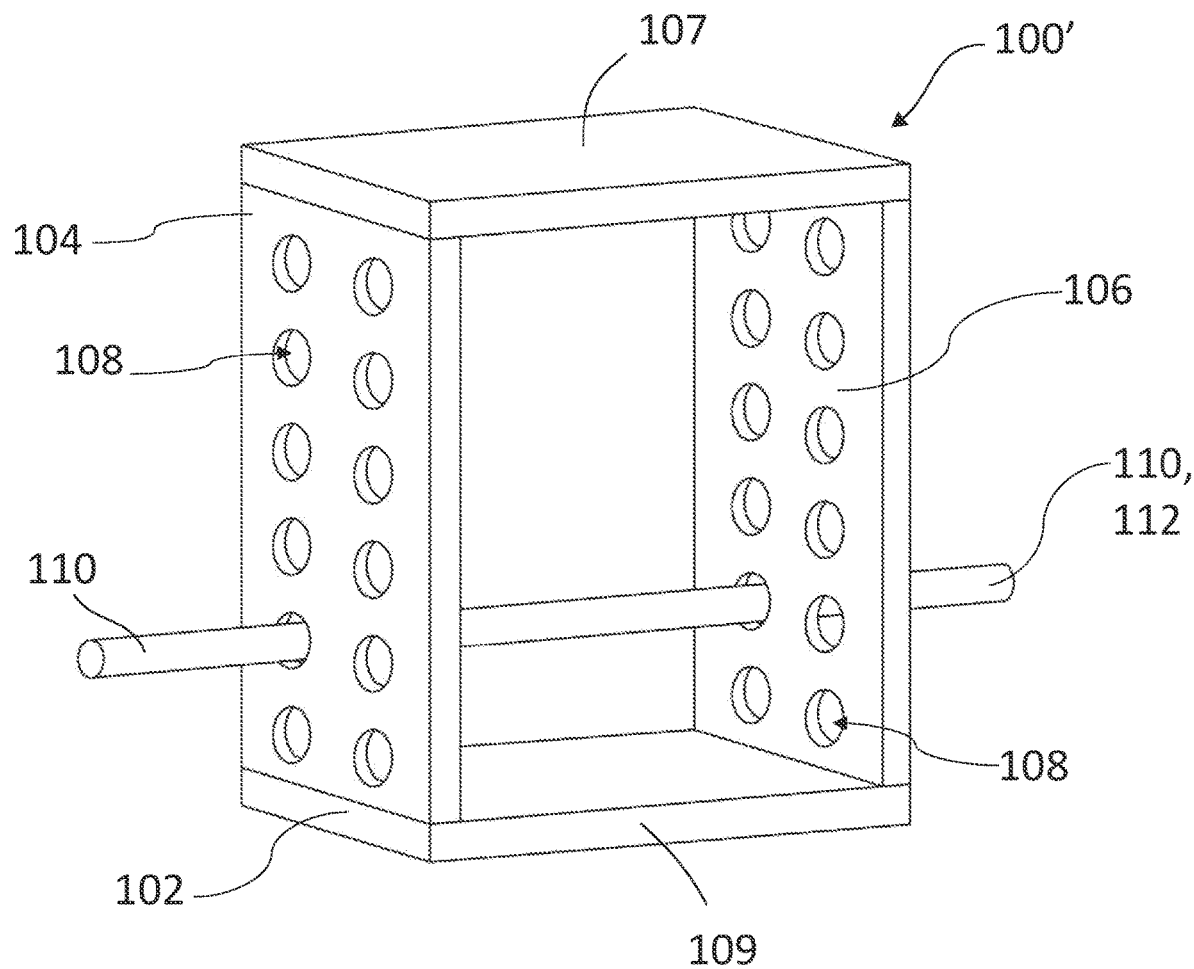
FIG. 4 is a perspective view of an animal retention apparatus in accordance with an embodiment and one or more aspects of the disclosure, the animal retention apparatus having a frame member that is a rectangular open-box prism in shape, which stands vertically, and which defines 12 passageways for removably holding at least one rod or support guide.

Referring to FIG. 4, there is shown an open box perspective view of another embodiment of an animal retention apparatus 100' comprising a frame member 102 having a first side 104 and a second side 106 which are preferably parallel to each other and planar. The frame member 102, as shown, is preferably in the shape of a rectangular prism. At least two other closed sides 107, 109, besides the first side 104 and the second side 106 are shown, but one of ordinary skills in art would appreciate that all sides of the frame member 102 may be covered. Animal retention apparatus 100' is shown standing vertically in FIG. 4, and the first side 104 of its frame member 102 is shown defining twelve passageways 108 therein. In accordance with an aspect of the disclosure, the animal retention apparatus 100' of this embodiment preferably further comprises at least one support guide 110. Each of the support guides 110 is receivable, received, and removably held in place by one of the passageways 108. The passageways 108 are preferably circular holes 108, the circular holes preferably passing through the first side 104 and with the second side 106 having a similarly-patterned plurality of holes therein corresponding to the first pattern of circular holes shown defined in the first side 104.

The open box embodiment 100' shown in perspective view in FIG. 4 illustrates preferably how the circular holes on the first side 104 of the frame member 102 align with the circular holes 108 on the second side 106 of the frame member 102. If desired, supports (not shown) may be added in between the first side 104 and the second side 106 to strengthen the integrity of the animal retention apparatus 100'. One support guide 110 (though more or fewer may be employed), in the form of a rod 110, within the frame member 102 is illustrated to show how the frame member 102 would receive and removably hold a support guide 110. The support guide 110 is long enough in length to be sticking out from both the first side 104 of the frame member 102, as well as from the second side 106 of the frame member 102. The rear portion 112 of the support guide 110 preferably sticks out of the second side 106.

Figure 5:
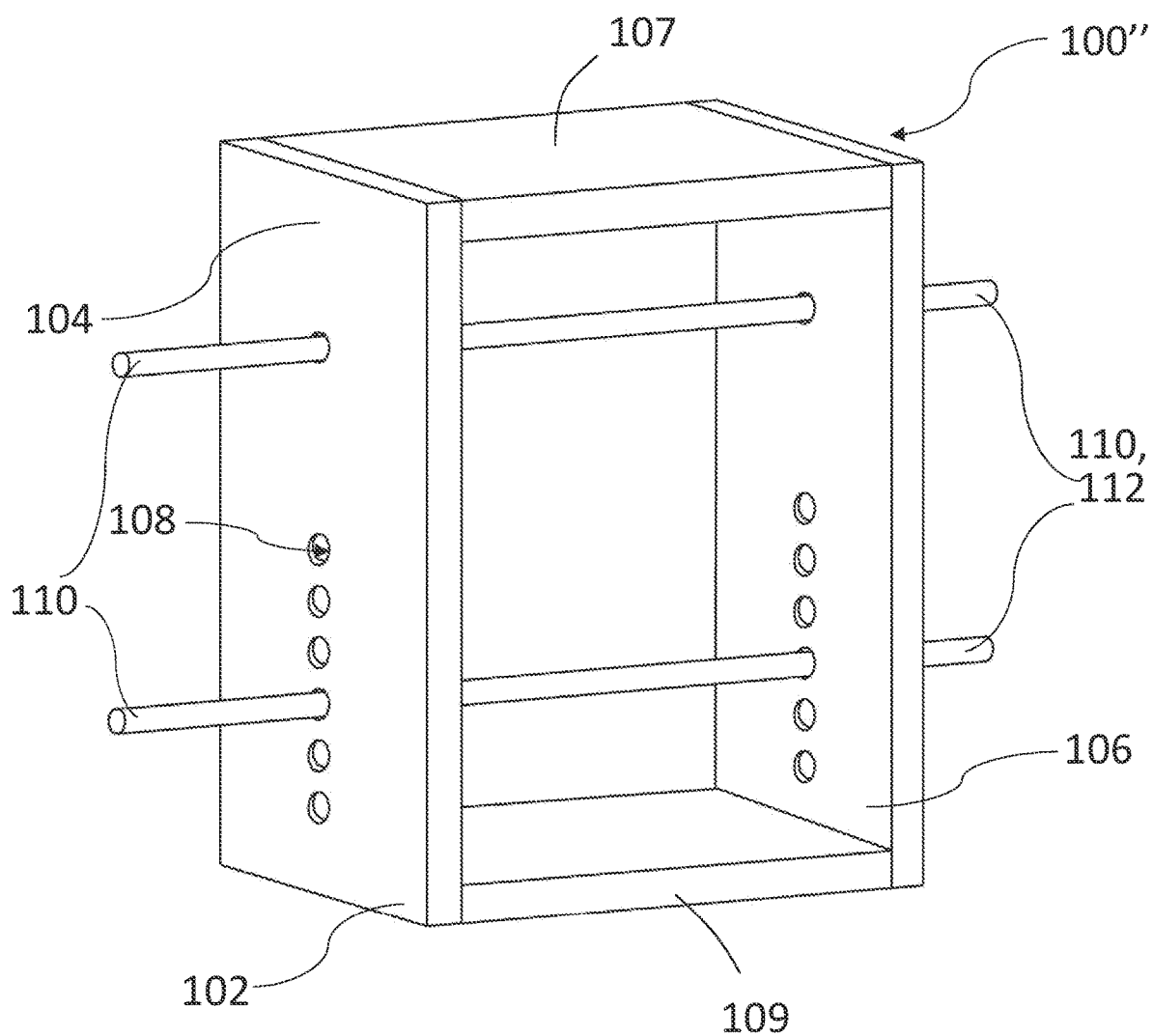
FIG. 5 is a perspective view of an open-box embodiment of an animal retention apparatus in accordance with one or more aspects of the disclosure, the apparatus having a frame member that is a rectangular prism in shape, that stands vertically, and that defines 7 passageways for removably holding at least one rod or support guide, but preferably a plurality of such rods or support guides.

Referring to FIG. 5, there is shown a perspective view of another embodiment of an animal retention apparatus 100" comprising a frame member 102 having a first side 104 and a second side 106 which are preferably parallel to each other and planar. The frame member 102, as shown, is preferably in the shape of a rectangular prism. The frame member 102 has four covered sides, including the first side 104, second side 106, and upper and lower sides 107, 109, in this illustration, but other sides of the frame member 102 can also be covered.

Animal retention apparatus 100" is shown standing vertically in FIG. 5, and the first side 104 of its frame member 102 is shown defining seven passageways 108 therein. In accordance with an aspect of the disclosure, the animal retention apparatus 100" of this embodiment preferably further comprises at least one of support guides 110. Each of the support guides 110 is receivable, received, and removably held in place by one of the passageways 108. The passageways 108 are preferably circular holes 108, and the circular holes 108 preferably pass through the first side 104 and with the second side 106 having a similarly-patterned plurality of holes 108 therein passing through and corresponding to the first pattern of holes 108 shown defined in the first side 104. The open box perspective of FIG. 5 illustrates preferably how the circular holes on the first side 104 of the frame member 102 align with the circular holes 108 on the second side 106 of the frame member 102.

FIG. 5 shows relatively smaller circular holes 108 and support guides 110 in comparison to those of FIGS. 1-4 and FIGS. 6-7, to illustrate versatility of the support guide(s) 110 and passageway 108 sizes. The circular holes are aligned with one another on each the first side 104 and the second side 106 to illustrate different possibilities for locations of passageways 108.

As mentioned in description of FIGS. 4 and 5, if desired, supports (not shown) may be added in between the first side 104 and the second side 106 to strengthen the integrity of the animal retention apparatus 100". Two support guides (though more or fewer may be employed) in the form of thin rods 110 within the frame member 102 are illustrated to show how the frame member 102 would receive and removably hold the support guides 110. The support guides 110 are long enough in length to be sticking out from both the first side 104 of the frame member 102, as well as from the second side 106 of the frame member 102. The rear portions 112 of the support guides 110 sticks out of the second side 106. FIG. 5 also demonstrates how the first side 104 and the second side 106 may connect with the frame member 102 differently from FIG. 4 without changing the integral aspects of the animal retention apparatus 100.

Figure 6:
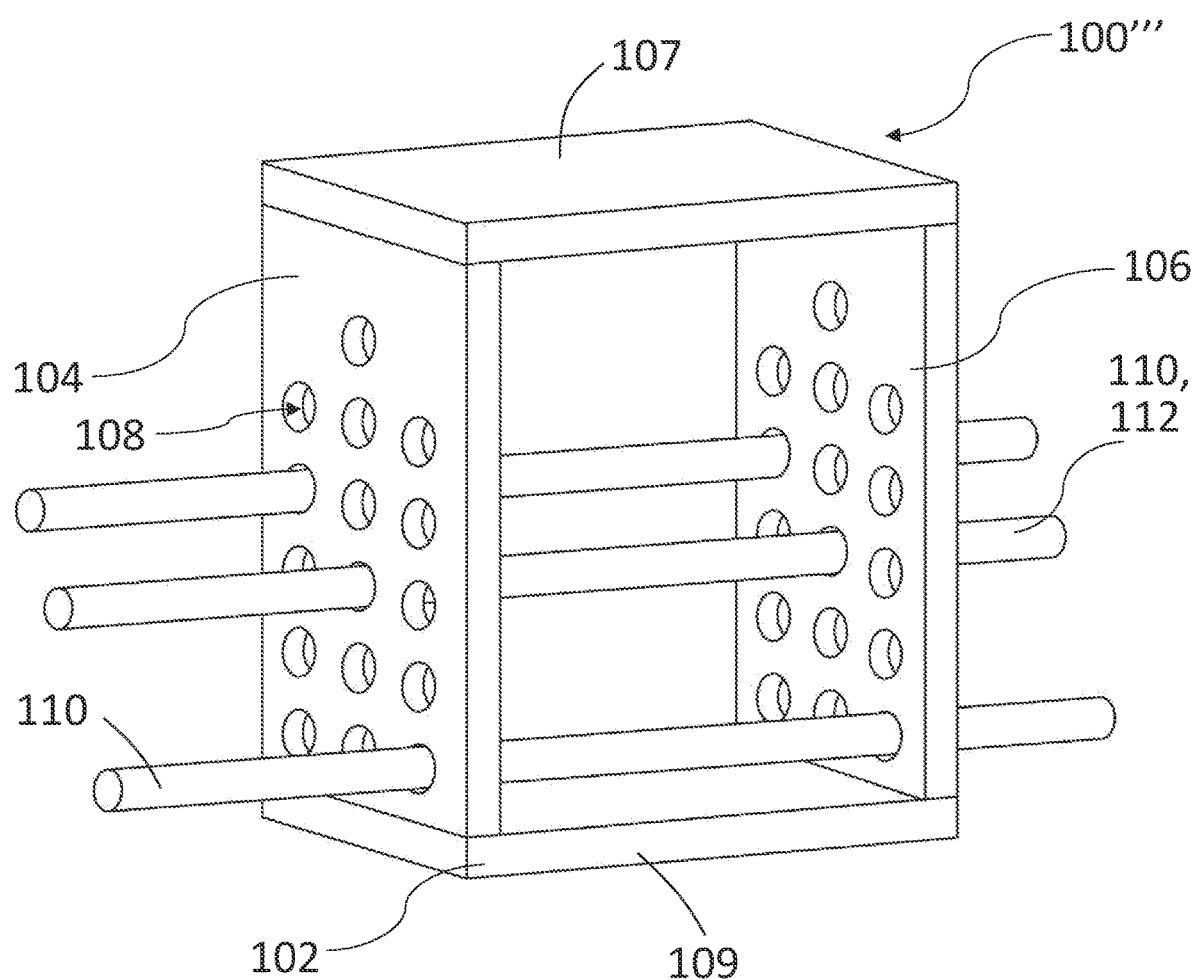
FIG. 6 is a perspective view of an open box embodiment of an animal retention apparatus in accordance with one or more aspects of the disclosure, the apparatus having a frame member that is a rectangular prism in shape, that stands vertically, and that defines 16 passageways for removably holding a plurality of rods or support guides.

Referring to FIG. 6, is shown a perspective view of an open-box embodiment of an animal retention apparatus 100''' comprising a frame member 102 having a first side 104 and a second side 106 which are preferably parallel to each other and planar. The frame member 102, as shown, is preferably in the shape of a rectangular prism. Animal retention apparatus 100''' is shown standing vertically in FIG. 6, and the first side 104 of its frame member 102 is shown defining sixteen passageways 108 therein. At least two other closed sides 107, 109, besides the first side 104 and the second side 106 are shown, but one of ordinary skill in art would appreciate that all other sides of the frame member 102, besides the first side 104 and the second side 106, may be covered. In accordance with an aspect of the disclosure, the animal retention apparatus 100''' of this embodiment preferably further comprises at least one of support guides 110. Each of the support guides 110 is receivable, received, and removably held in place by one of the passageways 108. The passageways 108 are preferably circular holes 108, the circular holes 108 preferably pass through the first side 104, and the second side 106 has a similarly-patterned plurality of holes 108 therein passing therethrough corresponding to the first pattern of holes 108 shown defined in the first side 104.

The open box embodiment 100''' of FIG. 6 illustrates preferably how the circular holes 108 on the first side 104 of the frame member 102 align with the circular holes on the second side 106 of the frame member 102. As mentioned in descriptions of FIG. 4 and FIG. 5, if desired, supports (not shown) may be added in between the first side 104 and the second side 106 to strengthen the integrity of the animal retention apparatus 100'''. Three support guides 110 (though more or fewer may be employed) in the form of rods 110 that are thicker than those of FIG. 5 within the frame member 102 are illustrated to show how the frame member 102 would receive and removably hold the support guides 110. The support guides 110 are preferably long enough in length to be sticking out from both the first side 104 and the second side 106 of the frame member 102. The rear portions 112 of the support guides 110 stick out of, or protrude from, the second side 106.

Figure 7:
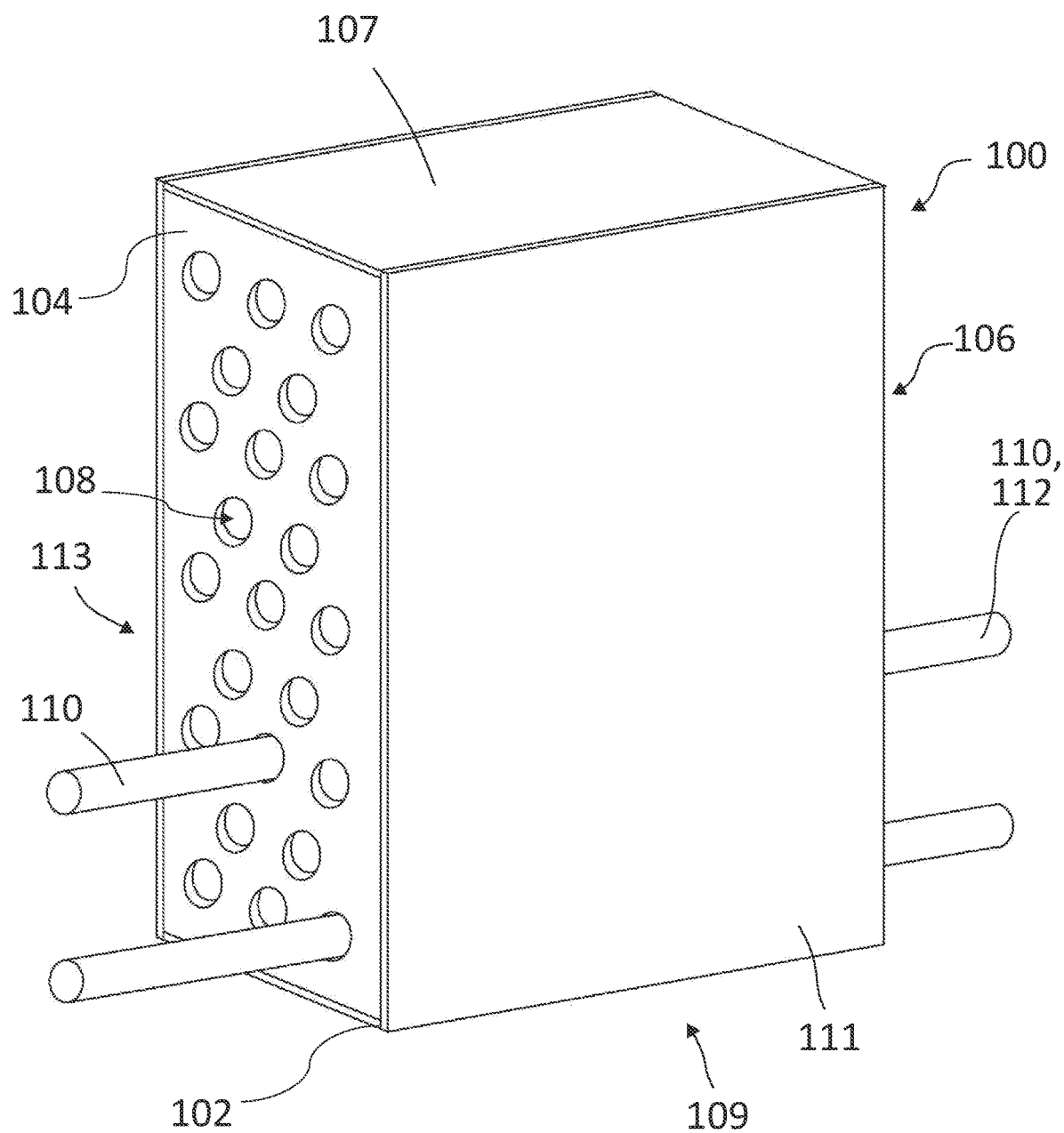
FIG. 7 is a perspective view of a closed box embodiment of an animal retention apparatus in accordance with one or more aspects of the disclosure, the apparatus having a frame member that is a rectangular prism in shape, that stands vertically, and that defines 23 passageways for releasably holding a plurality of rods or support guides.

Referring to FIG. 7, there is shown a perspective view of the embodiment of an animal retention apparatus 100 of FIGS. 1-3C illustrating how the frame member 102 may be closed. The animal retention apparatus 100 of this embodiment, standing vertically, is fully enclosed and rectangular-prism-shaped, with frame member 102 being defined by sides 104, 106, 107, 109 (not showing), 111, and 113 (not showing) also defines twenty-three circular-hole passageways 108. Two support guides, in form of rods, 110 within the frame member 102 are illustrated as an example of how the frame member would receive and removably hold the support guides 110. More or fewer support guides 110 may be employed. The support guides 110 are preferably long enough in length to be sticking out from both the first side 104 and the second side 106 of the frame member 102. The rear portions 112 of the support guides 110 sticks out of the second side 106. It will be appreciated that rear portions 112 of all two support guides illustrated are visible for FIG. 7 at the second side 106 that is parallel planar to the first side 104 of the frame member 102.

Referring to FIG. 8, there is shown an open-box embodiment of an animal retention apparatus 100"" comprising a frame member 102 having a first side 104 and a second side 106 which are preferably parallel to each other and planar. The frame member 102, as shown, is preferably in the shape of a rectangular prism. Animal retention apparatus 100"" is shown standing vertically in FIG. 8, and the first side 104 of its frame member 102 is shown defining 21 passageways 108 therein. At least two other closed sides 107, 109, besides the first side 104 and the second side 106 are shown, but one of ordinary skill in art would appreciate that all sides of the frame member 102, besides the first side 104 and the second side 106, may be covered. In accordance with an aspect of the disclosure, the animal retention apparatus 100"" of this embodiment preferably further comprises at least one of support guides 110'. Each of the support guides 110' is receivable, received, and removably held in place by one of the passageways 108. The passageways 108 are preferably circular holes 108, the circular holes 108 preferably pass through the first side 104, and the second side 106 has a similarly-patterned plurality of holes 108 therein passing therethrough corresponding to the first pattern of holes 108 shown defined in the first side 104. In this embodiment, each of the support guides 110' is inserted in an angle through the holes 108 of the first side 104 so the rear portions 112' of the support guides 110' exit through non-parallel (or non-aligned) holes 108 of the second side 106, with preferably one hole offsets. This angling allows the rear portions 112' of the support guides 110' to stick out of, or protrude from, the second side 106 in more narrow proximity to one another to more securely hold an animal. The animal is thus more securely held in place and prevented from escaping so persons, professional groomers and especially non-professional groomers, may more easily work on an animal using the device. The holes 108 may have larger diameters than the diameters of the support guides 110' to allow for easier angling. For example, the holes may be 1.5 inches in diameter and the support guides may be 1 and 5/16 inches in diameter. Even though FIG. 8 shows the angled support guides 110' entering through the first side 104 and exiting through the second side 106 in desired positions, one of ordinary skill in art would appreciate that the angled support guides 110' may be entered through the second side 106 and exit through the first side 104 in desired positions as well without departing from the true scope and spirit of the invention as claimed.

Referring to FIG. 9, there is shown a front view, showing the second side 106 of the embodiment of the animal retention apparatus 100" shown in FIG. 8, which is at least partially enclosed and rectangular-prism-shaped, with frame member 102 also defining 21 circular-hole passageways 108. The animal retention apparatus 100"" is standing vertically. As described in FIG. 8, each of the support guides 110' enters the holes 108 from the first side 104 (not shown) at an angle so that the each rear portions 112' of the support guides 110' exit through the non-parallel (or non-aligned) holes 108 on the second side 106, with preferably one hole offsets. FIG. 9 additionally shows the frame member 102 positioned alongside a dog 114, or wherein the dog 114 is positioned alongside the frame member 102, with two support guides 110' positioned below the dog's abdomen and coming up at an angle, thus assuring an inability of the dog to sit or lay down. Further, there are shown two other support guides 110', angled downwardly, one positioned above the dog's shoulder, to prevent the dog 114 from raising up on its hind legs, and another positioned above the dog's hind quarters, to prevent the dog 114 from jumping up or otherwise away. Thereby the ends of the four support guides 110' together come into more narrow proximity of one another, decreasing the amount of space the dog 114 has to escape. Thereby the dog 114 is more readily retained in a desired position to be worked on for works such as grooming, washing, and veterinary work. This additional security allows non-professionals, such as pet owners, to work on an animal more easily and safely.

Referring to FIG. 10, there is shown a perspective view of an embodiment of an animal retention apparatus 100 similar to that of FIGS. 1, 2A, 2B, 3A, and 3B comprising an at least partially enclosed and rectangular prism shaped, with frame member 102 also defining 23 circular hole passageways 108. The animal retention apparatus 100 is shown standing vertically in FIG. 10 and is illustrated at an angle that shows the first side 104 with a dog 114 positioned alongside the frame member 102 in a manner to that shown in FIG. 3A. However, it will also be appreciated that this aspect of the disclosure may also be used with animal retention apparatus 100', 100", 100''', 100'''', 100''''', whether any of these be positioned vertically or horizontally. The second side 106 of the frame member 102 is parallel planar to the first side 104. The animal retention apparatus 100 in FIG. 10 has fewer support guides 110, as compared for example to FIG. 3A, since the apparatus 100 is used differently in FIG. 10, wherein the animal is now secured in position with a tie member 206.

FIG. 11 is a frontal view embodiment of the animal retention device rod 110 (112) with a preferred reusable rubber-exterior twist tie-type tie member 206. The tie member 206 preferably comprises an outer rubber coating 205 having therein an internal wire (shown with dotted lines 207) causing the tie member to maintain shape as it is configured by a user to secure an animal in the area 220 by placing the rod 110 (112) under some part of the animal's anatomy and further securing the animal with the tie member 206 wrapped around the animal (not shown in FIG. 11). Each end 210, 211 of the tie member 206 is secured to the rod 110 (112) by wrapping the ends around the rod as shown at tie locations 208 and 209. The preferred internal wire-type rubber exterior tie member 206 may be obtained at many hardware stores.

Preferably, each end 210 and 211 of the tie member 206 is wrapped around the rod 110 to help secure the animal 114 in place relative to each rod 110 and the frame structure 102. It will be appreciated that the tie member 206 may also be used in connection with the animal retention device 100 (or 100', 100", 100''', 100'''') hereof. Thus, the animal (not shown in FIG. 11) would be retained under the rod 110 in the area 220, and relative to the frame 102, as the tie member 206 would be tight enough to maintain the animal's position, but not so tight as to cause the animal discomfort.

As shown in FIG. 12, there is provided a side view of an embodiment of an animal retention device rod 110 with a tie member 206 which maintains shape configured to secure an animal in the area 230 and relative to the frame 102 and rod 110. Positioned as shown in FIG. 12, the rod 110 may be placed over some part of the animal's anatomy, and thereafter the animal may be further secured with the tie member 206 wrapped around (underneath, for example) the animal, and each end of the rod 110 may be further secured by wrapping the ends 210 and 211 of the tie member 206 around the rod as shown at tie locations 208 and 209. The tie member 206 may simply be of unitary construction and simply comprise an otherwise bendable member 206 as illustrated in FIG. 12.

Referring to FIG. 13, there is shown a front view, showing the second side 106 of the embodiment of the animal retention apparatus 100 of FIGS. 1, 2A, 2B, 3A, and 3B, which is at least partially enclosed and rectangular prism shaped, with frame member 102 also defining 23 circular-hole passageways 108. The animal retention apparatus 100 is standing vertically, though it will be appreciated that this aspect of the disclosure may also be used with animal retention apparatus 100', 100'', 100''', 100'''', 100''''', and whether any of these be positioned vertically or horizontally, without departing from the scope of the animal retention device as claimed. As shown in FIG. 13, the frame member 102 is positioned alongside a dog 114, or wherein the dog 114 is positioned alongside the frame member 102, with a support guide 110 positioned above the dog's shoulder providing a restraint to prevent the dog 114 from jumping up on its hind legs, and another dowel 202 positioned below the dog's belly, to prevent the dog from laying down. The tie member 206 may alternatively be wrapped around the neck of the animal 214 with ends 210, 211 of the tie member being secured at opposite sides of the animal to the rod 110, the rod 110 providing a base for wrapping the tie member in position to keep the animal from moving from its desired position to be worked on for works such as grooming, washing, and veterinary work. This additional security allows pet owners, and even professional groomers and veterinarians, etc., to work on animals more easily and safely.

From the foregoing, it will be appreciated that there is further disclosed herein a method of working with an animal, either to groom it or to perform veterinary procedures, or otherwise, comprising the steps of:

Obtaining an animal retention apparatus, said animal retention apparatus comprising a frame member having a first side and a second side, a plurality of support guides adapted for removable retention partially within said frame member, and tie member adapted for wrapping around the animal;

positioning an animal alongside said first side of said frame member;

placing said support guides at height and width locations defined by said frame member so as to extend outwardly from said frame member so that said support guides are adapted to hold the animal in a desired position;

wrapping a first end of a tie member around a support guide between the animal and the frame member;

wrapping an intermediate portion of the tie member around the animal's body;

wrapping a second end of the tie member around the support guide adjacent a side of the animal opposite the side adjacent which the first end of the tie member is wrapped;

working on a side of the animal that is facing away from said first side of said frame member;

removing the tie member from around the support guide and from around the animal; and removing the animal from said animal retention apparatus.

One of ordinary skill in the art will recognize the inventive principles disclosed are not limited to the embodiments disclosed herein, and that various aspects of the disclosed embodiments may be combined to achieve additional embodiments.

In the preceding description, numerous details were set forth. It will be apparent, however, to one skilled in the art, that the present invention may be practiced without some of these specific details. Additionally, one of ordinary skill in the art will recognize the inventive principles disclosed are not limited to the embodiments disclosed herein, and that various aspects of the disclosed embodiments may be combined to achieve yet additional embodiments.

The animal retention apparatus and methods of the present disclosure address problems with prior art apparatus and methods of working on a retained animal. This is because the present apparatus and methods help to alleviate stress for the animal and the need for other restraining methods. The apparatus allows a worker to manage an animal by his or herself without needing the assistance of another to hold the animal down. Thus, the present apparatus and methods will enhance retention of an animal to be worked on, and especially in challenging cases of veterinary work and grooming.

Thus, while a preferred embodiment of the present disclosure has been shown and described, it will be apparent to those skilled in the art that many changes and modifications may be made without departing from the claimed subject matter in its broader aspects. For example, it will be appreciated that one of ordinary skill in the art may mix and match the various components of the various embodiments of the claimed subject matter without departing from the true spirit of the claims. The appended claims are therefore intended to cover all such changes and modifications as fall within the true spirit and scope of the invention.

What is claimed is:

1. An animal retention apparatus, comprising:
   at least one support guide; and
   at least one tie member; and
   a frame member having at least one passageway defined therein to receive and removably hold said support guide at a height and width location in said frame member such that said support guide sticks out of said frame member at a location corresponding to a portion of the animal's anatomy adapted for use in reassuring a desired position of the animal as the animal is brought into adjacent contact with said support guide as the animal is positioned alongside said frame member, wherein said tie member is adapted for wrapping around a portion of said animal's anatomy and a portion of said support guide.

2. The apparatus of claim 1, wherein said at least one support guide comprises a plurality of support guides, wherein said at least one passageway comprises a plurality of passageways, wherein said support guides are enabled in sticking out of said frame member at variable positions corresponding to portions of the animal's anatomy and adapted for use in reassuring a desired position of the animal as the animal is brought into adjacent contact with said support guides as the animal is positioned along said frame member, and wherein said tie member is adapted for being wrapped around at least one of said plurality of support guides and positioned around the animal in one of around and above the animal, in front of the animal, behind the animal, and around and under the animal.

3. The apparatus of claim 1, wherein said tie member comprises a rubber outer portion with a wire core adapted for allowing changed reconfiguration of portions of the tie member and so that it may retain such changed reconfiguration to better hold an animal in place during use.

4. A method of working on an animal, comprising:
obtaining an animal retention apparatus, said animal retention apparatus comprising a frame member having a first side and a second side and a plurality of support guides adapted for removable retention partially within said frame member;
positioning an animal alongside said first side of said frame member;
placing said support guides at height and width locations defined by said frame member so as to extend outwardly from said frame member so that said support guides are adapted to hold the animal in a desired position;
wrapping a first end of a tie member around a support guide between the animal and the frame member;
wrapping an intermediate portion of the tie member around the animal's body;
wrapping a second end of the tie member around a support guide adjacent a side of the animal opposite the side adjacent which the first end of the tie member is wrapped;
working on a side of the animal that is facing away from said first side of said frame member;
removing the tie member from around the support guide and from around the animal; an
removing the animal from said animal retention apparatus.

5. The method of claim 4, wherein the work done is grooming.

6. The method of claim 4, wherein the work done is veterinary work.

7. The method of claim 4, wherein the work done is washing of an animal.

8. An animal retention apparatus, comprising:
a plurality of rods;
a frame member having at least a first side and a second side that are parallel planar to each other, each said first side and said second side defining a plurality of aligned passageways adapted to receive and removably hold said rods at variable height and width locations in said frame member such that said rods are adapted for sticking out of said frame member at locations corresponding to portions of the animal's anatomy; and
at least one flexible tie member adapted for being wrapped and retain around at least one of said plurality of rods, wherein said animal retention apparatus is adapted for use in reassuring a desired position of the animal as the animal is enabled in positioned alongside said first side of said frame member in adjacent contact with said rods, and further retained by said at least one flexible tie member, as the animal is positioned alongside said first side of said frame member for working on a side of the animal that faces away from said first side, and wherein thereafter the animal is enabled in being positioned alongside said second side of said frame member, together with being retained by said at least one flexible tie member, for working on the side of the animal that is facing away from said second side of the said frame member.

9. The apparatus of claim 8, wherein said tie member comprises a rubber outer portion with a wire core adapted for allowing changed reconfiguration of portions of the tie member and so that it may retain such changed reconfiguration to better hold an animal in place during use.

10. The apparatus of claim 8, wherein said tie member is adapted for being wrapped around at least one of said plurality of rods and positioned around the animal in one of around and above the animal, in front of the animal, behind the animal, and around and under the animal.

11. The apparatus of claim 10, wherein said rods and said tie member are adapted for assuring positioning of a dog during grooming, and wherein said rods and said passageways are adapted for positioning of at least one rod portion beneath the dog's abdomen to prevent the dog from sitting or lying down during grooming.

12. The apparatus of claim 10, wherein said passageways, said rods, and said tie member are adapted for assuring positioning by positioning a rod portion above the dog's back, with said tie member wrapping beneath the dog, to prevent the dog from jumping up during grooming.

13. The apparatus of claim 10, wherein said passageways, said rods, and said tie member are further adapted for positioning a portion of said tie member in front of the dog's chest to prevent the dog from lunging forward during grooming.

14. The apparatus of claim 10, wherein said passageways, said rods, and said tie member are further adapted for positioning a portion of said tie member behind the dog's rear to prevent the dog from backing out of the restraint during grooming.

15. The apparatus of claim 10, wherein said passageways, said rods, and said tie member are adapted for assuring positioning by positioning a rod portion below the dog and with said tie member wrapping around and above the dog, to prevent the dog from jumping up or lying down during grooming.

\* \* \* \* \*